July 3, 1962  R. A. FANTI  3,042,371
VARIABLE CAMBER BLADING
Filed Sept. 4, 1958  4 Sheets-Sheet 1

INVENTOR
ROY A. FANTI
BY Leonard F. Weklind
ATTORNEY

July 3, 1962  R. A. FANTI  3,042,371
VARIABLE CAMBER BLADING
Filed Sept. 4, 1958  4 Sheets-Sheet 2
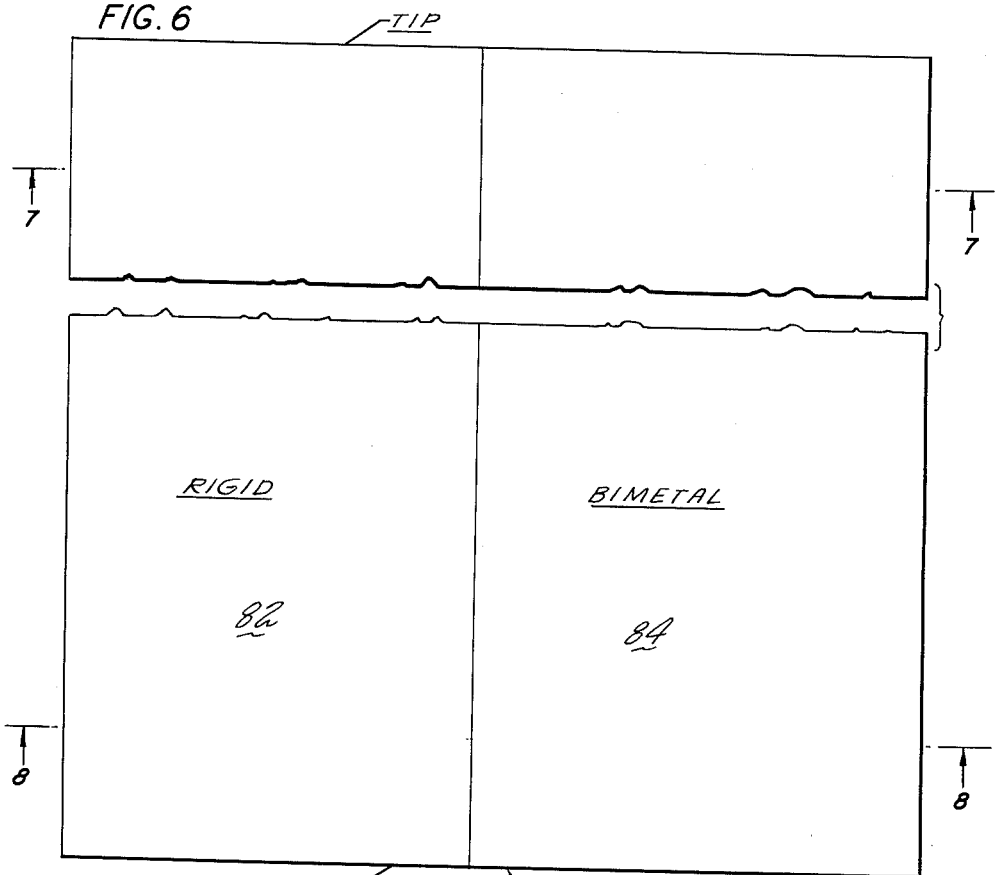
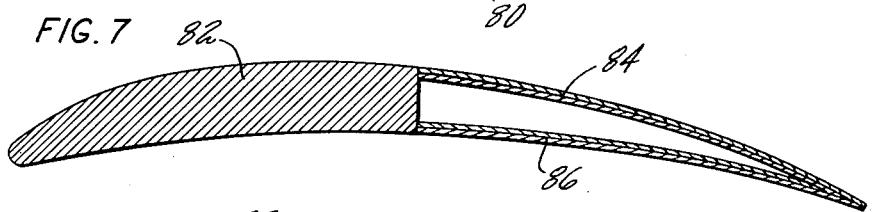
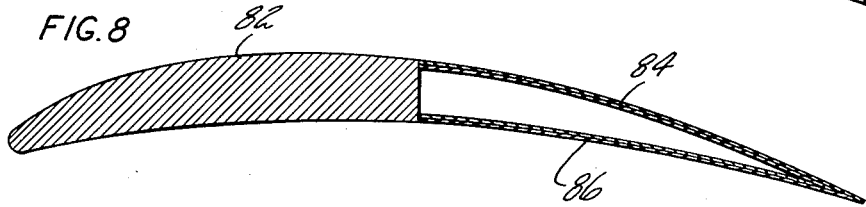
INVENTOR
ROY A. FANTI
BY Leonard F. Wellind
ATTORNEY July 3, 1962 R. A. FANTI 3,042,371
VARIABLE CAMBER BLADING
Filed Sept. 4, 1958 4 Sheets-Sheet 3
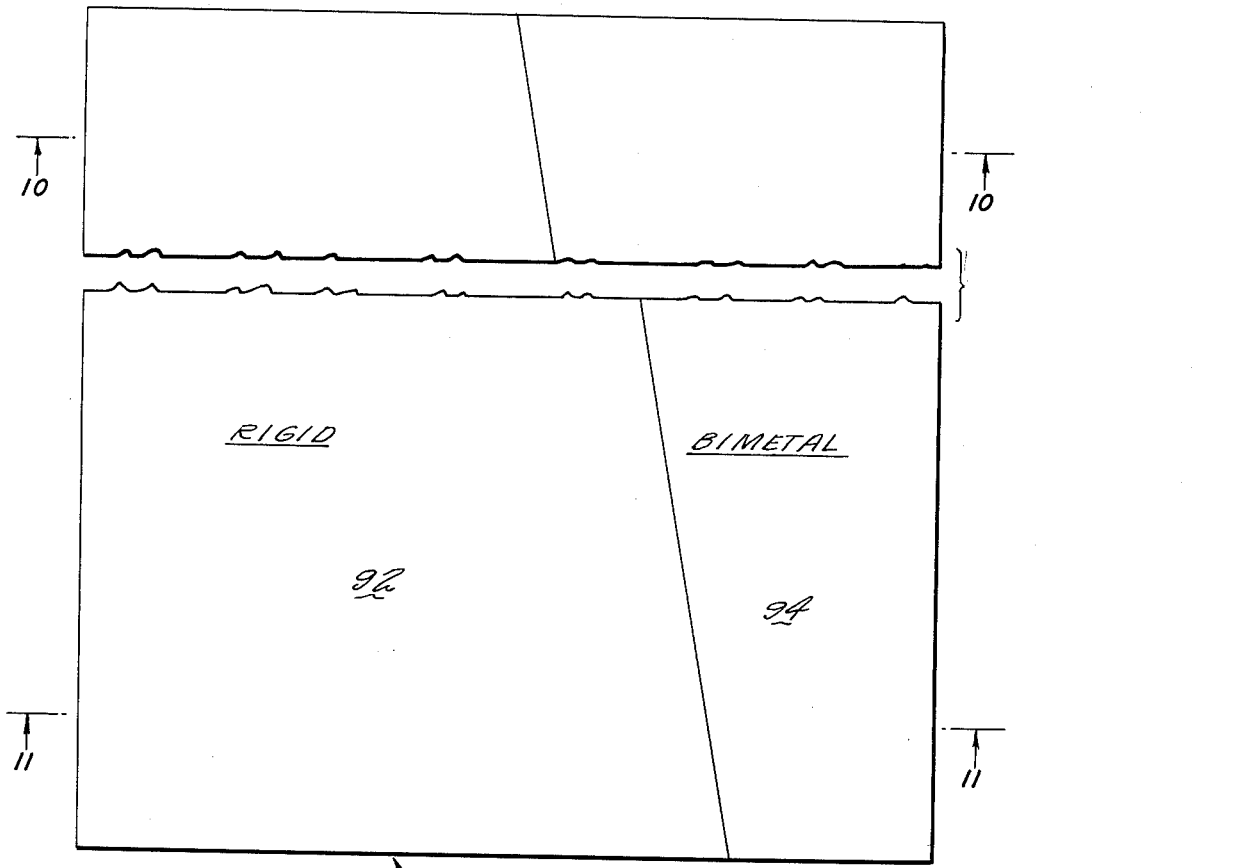
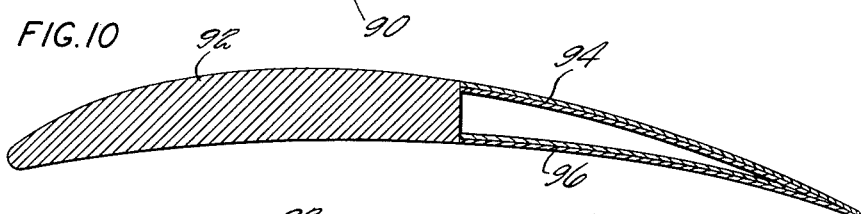
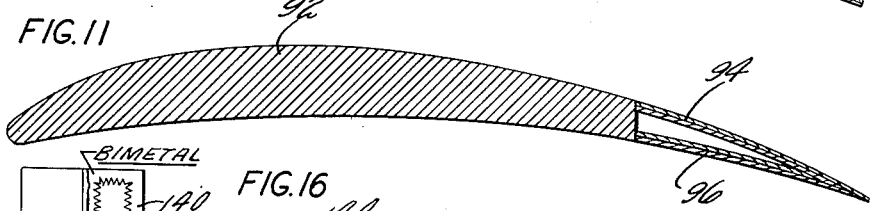
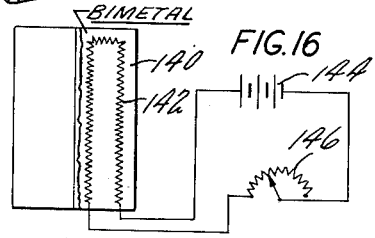
INVENTOR
ROY A. FANTI
BY Leonard F. Wakelin
ATTORNEY July 3, 1962 R. A. FANTI 3,042,371
VARIABLE CAMBER BLADING
Filed Sept. 4, 1958 4 Sheets-Sheet 4
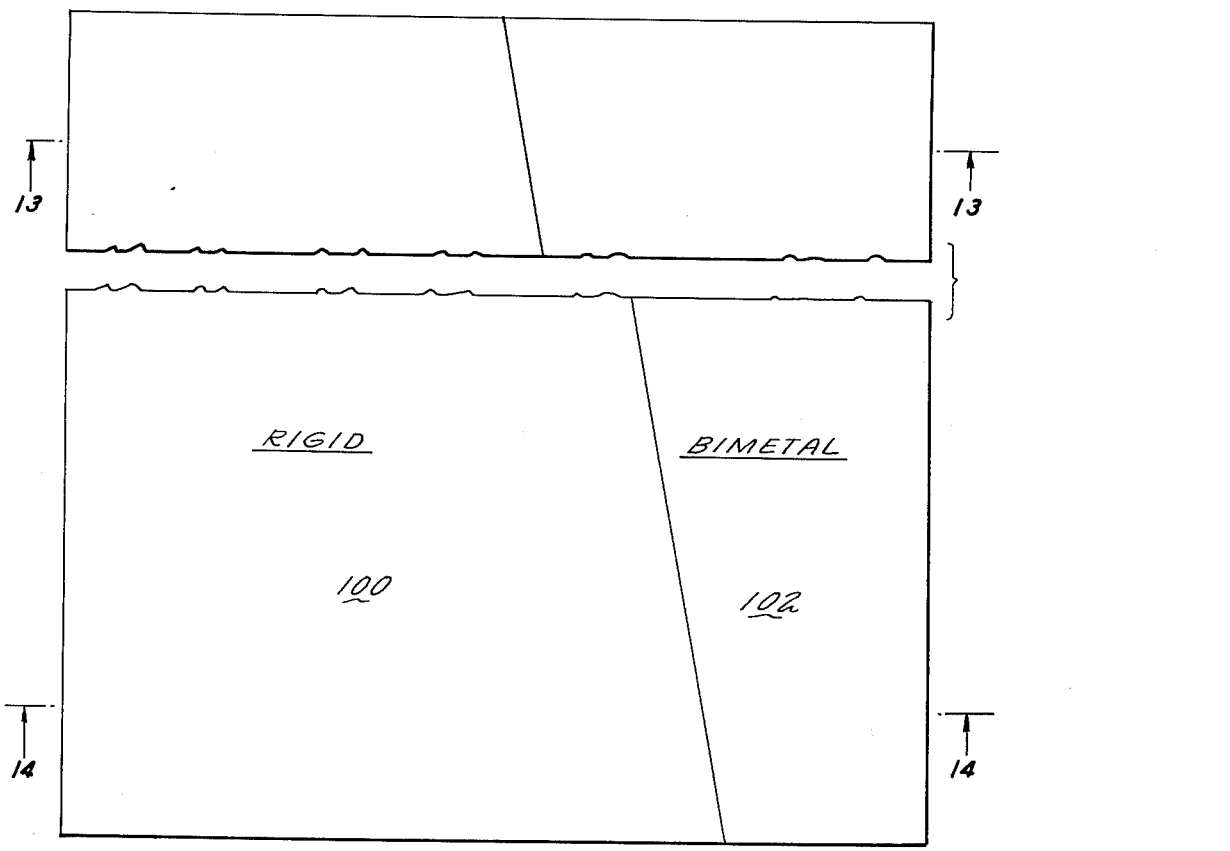
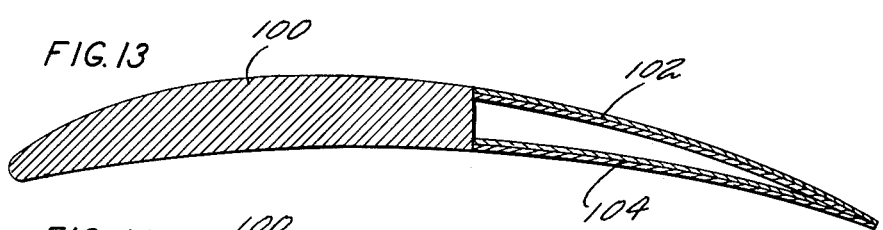
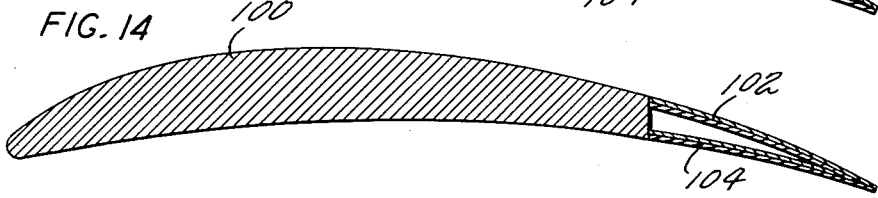
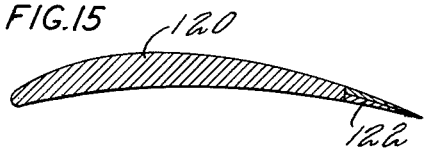
INVENTOR
ROY A. FANTI
BY Leonard F. Weklind
ATTORNEY

United States Patent Office 3,042,371
Patented July 3, 1962

3,042,371
VARIABLE CAMBER BLADING
Roy A. Fanti, Springfield, Mass., assignor to United Aircraft Corporation, East Hartford, Conn., a corporation of Delaware
Filed Sept. 4, 1958, Ser. No. 759,044
2 Claims. (Cl. 253—78)

This invention relates to turbomachine blading and more particularly to blading for compressors and the like which are of variable camber.

High-thrust turbojet engines have mission requirements which cause certain compressor stages (in particular inlet stages) to become stalled during off-design operations. It is well known that, as a consequence, the high-altitude surge margin of the engine can be significantly reduced. In addition, stiffer blades (hence, weight penalty) must be designed into the stage to assure low-response amplitudes from such phenomena as rotating stall or stall flutter.

Recognition of these practical problems has placed renewed emphasis on means of adjusting flow triangles during off-design operation so as to minimize or avoid stall operation. Mechanical variation of inlet guide vanes and the use of pressure jets to hydrodynamically vary the turning angle are already under some consideration but these entail large weight penalties.

Advantage could be taken of conditions as they exist in the compressor and obtain this control thermodynamically through the use of blading which is in part or entirely bimetallic in construction. The large differential changes in temperature necessary to make such a scheme practical appear available simply through the increased temperature obtained accelerating from a cruise condition to an attack or dash condition. Additional control can be provided through the application of cooling or heating ports or through heating elements embedded in the blade as necessary. The particular advantage this type of device has over mechanical variation of guide vanes or other proposed schemes would be the elimination of heavy accessory apparatus which is necessary in order to make the other schemes practical.

It is an object of this invention to provide blading for turbomachinery such as compressors with the blading being of bimetallic construction either in part or entirety such that the camber of the blades is varied with a variation in temperature of the fluid being worked. In high performance compressors for aircraft gas turbine power plants an increase in Mach number is accompanied by an increase in ram pressure and temperature at the inlet to the power plant. In order to maintain high efficiencies over a large range of Mach numbers, it is necessary to either vary the pitch or the camber of the blading throughout the operating range. Therefore, it is an object of this invention to provide a blade arrangement whereby the camber can be varied automatically as the fluid temperature increases. Also the camber can be minutely controlled by artificially heating the bimetal portion of the blade. This result is achieved with substantially no weight penalty and with a simple mechanism.

These and other objects of this invention will become readily apparent from the following detailed description of the drawings in which:

FIG. 6 is a plan form of a uniform chord of a blade;

FIGS. 7 and 8 are taken along the lines 7—7 and 8—8 of FIG. 6 showing the tapered thickness of the bimetal;

FIG. 9 is a modified blade plan form illustrating the plan form taper of the bimetal;

FIGS. 10 and 11 are cross sections taken along the lines 10—10 and 11—11 of FIG. 9;

FIGS. 12 through 14 are similar to FIGS. 9 through 11 but illustrate both the plan form taper and thickness taper of the bimetal;

FIG. 15 is a cross-sectional illustration of a modified bimetal arrangement on the trailing edge of a blade; and FIG. 16 is a plan view of a blade illustrating a controlled heating element embedded in the blade.

Figure 1:
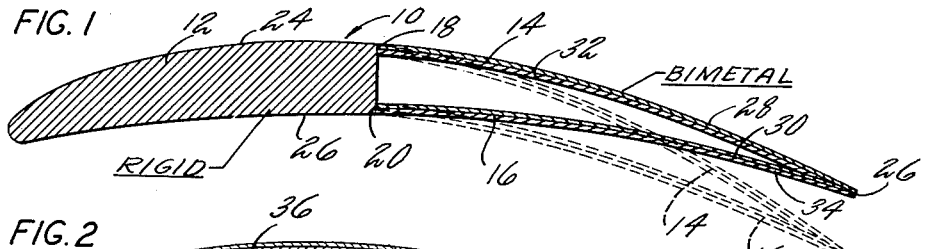
FIG. 1 is a cross section of a typical blade having a bimetal aft portion.

Referring to FIG. 1 the cross section of a typical compressor blade is generally indicated at 10. The blade 10 includes a rigid spar-like member 12 which extends the full span of the blade. Suitably connected to the spar and extending in an aft direction are upper and lower bimetallic sheets 14 and 16. The bimetallic sheets 14 and 16 are connected at their upstream ends 18 and 20 to the rigid spar member 12 and form a downstream continuation of the upper and lower airfoil surfaces 24 and 26 of the spar 12. The bimetal sheets 14 and 16 are connected together at their aft end 26 to form the spanwise trailing edge of the airfoil. The outer layer 28 of the upper sheet 14 and the inner layer 30 of the lower sheet 16 are of the same metal. Likewise the inner layer 32 of the upper sheet 14 and the outer layer 34 of the lower sheet 16 are also of the same metal but one which differs from that used in the layers 28 and 30. Thus, with an increase in temperature, the trailing edge of the blade 10 will deflect to the dotted line position shown in FIG. 1 thereby increasing the camber of the blade.

Figure 2:
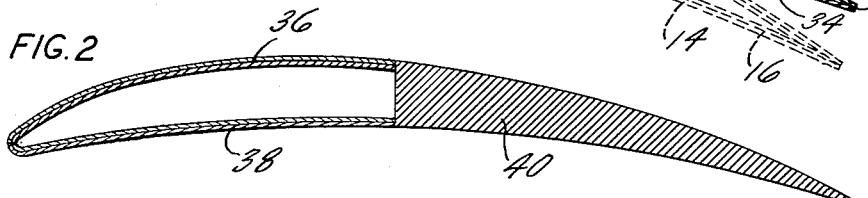
FIG. 2 is similar to FIG. 1 but shows an airfoil having a bimetal leading edge portion.

FIG. 2 is similar to FIG. 1 except that the leading edge portion of the blade comprises upper and lower bimetallic sheets 36 and 38, respectively. These sheets are suitably connected to a rigid spar-like member 40 which forms the trailing portion of the blade and extends the full span of the blade.

Figure 3:
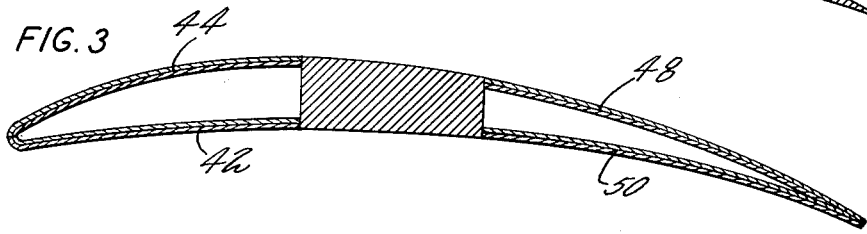
FIG. 3 is a cross-sectional illustration of a blade having both leading and trailing edge bimetal portions.

FIG. 3 is a modification illustrating a central spar-like rigid member 42 to which are attached leading edge bimetallic sheets 44 and 46 and trailing edge bimetallic sheets 48 and 50. With this type of construction the camber can be greatly increased with an increase in temperature since both the leading and trailing edges will tend to increase in curvature.

Figure 4:
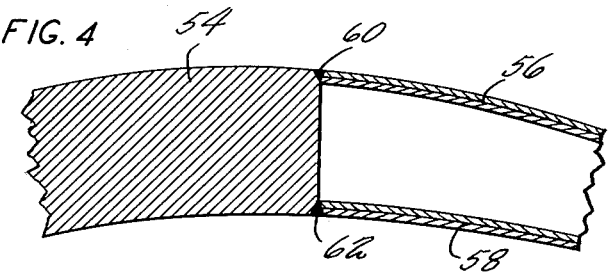
FIG. 4 is a partial cross section of a blade indicating the attachment for the bimetal.

FIG. 4 illustrates a spar-like member 54 to which are attached upper and lower bimetallic sheets 56 and 58 by means of welds 60 and 62 on the upper and lower surfaces, respectively.

Figure 5:
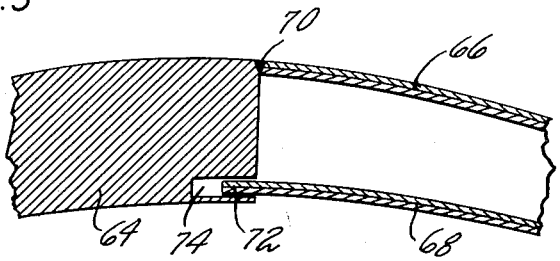
FIG. 5 is similar to FIG. 4 but illustrates a modified form of bimetal attachment.

FIG. 5 illustrates a rigid spar-like member 64 having upper and lower bimetallic sheets 66 and 68 extending aft therefrom. The upper sheet 66 is connected to the spar-like member 64 by a suitable weld 70. The lower sheet 68 terminates in an upstream end 72 which fits in a cooperating slot 74 in the aft end of the spar 64. In this manner the bending or warping of the bimetallic elements 66 and 68 is facilitated because the end 72 of the bimetallic sheet 68 is free to move fore and aft. In actual experience this has proved to be very effective.

In order to either conform to the taper of the blade in an outboard direction or to vary the amount of camber along the span of the blade, the thickness of the bimetallic material or sheets may vary along the span. Thus, as illustrated in FIGS. 6 through 8, a blade 80 is illustrated as having a rigid spar-like portion 82 running spanwise of the blade. Bimetallic sheets 84 and 86 are suitably connected to form the streamlined trailing portion of the blade. However, as clearly shown in FIGS. 7 and 8, the bimetallic sheets get progressively thinner as the outboard or tip portion of the blade is approached.

A further modification is shown in FIGS. 9 through 11. Herein a blade 90 is shown as having a rigid spar-like member 92 which runs spanwise of the blade. Bimetallic sheets 94 and 96 are connected to the aft end of the spar 92 to form the trailing edge of the blade. However, as clearly seen in FIG. 9, the chordwise dimension of the sheets increases in an outboard direction. In this way the camber near the tip will be greater than the camber near the root of the blade when the temperature of the blade is increased. A difference in chordwise dimension of the bimetallic sheets 94 and 96 is clearly shown in FIGS. 10 and 11.

FIGS. 12 through 13 illustrate another modification of the blade for both a tapered plan form and a tapered thickness of the bimetallic material. Thus, the spar 100 has connected thereto bimetallic sheets 102 and 104 to form the trailing edge portion of the blade. As seen in FIG. 12 the bimetallic sheet 102 increases in chordwise dimension in a spanwise direction. This modification is further clearly illustrated in FIGS. 13 to 14. The thickness of the bimetallic sheets 102 and 104 varies between the inboard and outboard direction. The bimetallic portion of this blade may get thinner or thicker in an outboard direction depending on the camber distribution desired.

FIG. 15 shows another modification of this invention. As illustrated herein, a rigid spar-like blade portion 120 is shown as forming a major portion of the leading edge of the blade. Approximately the last 20 percent of the blade configuration comprises a bimetallic portion 122 which is solid and conforms to the shape of the blade thereby forming a downstream continuation of the spar 120. As a result the spar 120 and the bimetal portion 122 form a completed blade profile.

As a result of this invention, a very simple, highly efficient means is provided for maintaining the efficiency of turbo-machinery over a wide range of operating conditions. Furthermore, aircraft gas turbines will have compressors operating at peak efficiency over a wide range of Mach numbers.

As seen in FIG. 16, a blade is shown as having a bimetal portion 140 in which is embedded a heating element 142 whose temperature can be controlled by a battery 144 and a variable resistance or rheostat 146.

Although several embodiments of this invention have been illustrated and described herein, it will be apparent that various changes may be made in the construction and arrangement of the various parts without departing from the scope of the novel concept.

What it is desired by Letters Patent is:

1. An airfoil blade construction for a compressor or the like comprising a rigid metal spar-like spanwise member having upper and lower surfaces forming a part of the upper and lower airfoil surfaces, upper and lower bimetallic sheets with each sheet comprising a pair of metal layers having different expansion coefficients, said sheets being of different metal than that of said spar, said sheets extending from the upper and lower airfoil surfaces respectively to form a streamlined continuation thereof along the chordwise axis of the blade, said sheets being fixedly joined together at one chordwise end thereof to form one spanwise edge of the blade, the other chordwise ends of said sheets being spaced apart, and means for rigidly mounting at least one of said sheets at the other of its chordwise ends to said spanwise member, and second upper and lower bimetallic sheets substantially similar to said first-mentioned sheets and extending from said upper and lower airfoil surfaces in a chordwise direction opposite from said first-mentioned sheets, said second sheets being joined together at one end to form the other spanwise edge of said blade and being spaced apart at their juncture with the airfoil surfaces of said spar-like members.

2. An airfoil blade construction for a compressor or the like comprising a rigid metal spar-like spanwise member having upper and lower surfaces forming a part of the upper and lower airfoil surfaces, upper and lower bimetallic sheets each comprising a pair of metal layers having different expansion coefficients and being bonded together substantially over their entire area, said sheets being of a metal different than that of said spar, each of said sheets having an upper metal layer of greater coefficient of expansion than the lower layer of each said sheet whereby the airflow over the upper airfoil surface contacts the metal layer of greater coefficient of expansion and the airflow over the lower airfoil surface contacts the metal layer of lesser coefficient of expansion, whereby with an increase in temperature said sheets will have a deflection in a downward direction, said sheets extending from the upper and lower airfoil surfaces respectively to form a streamlined continuation thereof along the chordwise axis of the blade, said sheets being fixedly joined together at one chordwise end thereof to form one spanwise edge of the blade, the other chordwise ends of said sheets being spaced apart, and means for rigidly mounting at least one of said sheets at the other of its chordwise ends to said spanwise member.

References Cited in the file of this patent

UNITED STATES PATENTS

| | | |
|---|---|---|
| 1,015,552 | Gamon | Jan. 23, 1912 |
| 2,295,944 | Fitzsimmons | Sept. 15, 1942 |
| 2,789,808 | Blackman | Apr. 23, 1957 |

FOREIGN PATENTS

| | | |
|---|---|---|
| 14,320 | Germany | Oct. 25, 1956 |
| 100,913 | Austria | Apr. 15, 1925 |
| 833,537 | Great Britain | Apr. 27, 1960 |